July 2, 1963  D. H. BOTT ETAL  3,095,854
MOVABLE ANIMAL RESTRAINING PLATFORM FOR MILKING STATION
Filed April 19, 1961  5 Sheets-Sheet 1

INVENTORS.
DELMAR H. BOTT
MARVIN O. BOTT
BY Sutherland Polster + Taylor
ATTORNEYS.

July 2, 1963　　　　D. H. BOTT ETAL　　　　3,095,854
MOVABLE ANIMAL RESTRAINING PLATFORM FOR MILKING STATION
Filed April 19, 1961　　　　　　　　　　　　5 Sheets-Sheet 3

INVENTORS.
DELMAR H. BOTT
MARVIN O. BOTT
BY Sutherland, Polster & Taylor
ATTORNEYS.

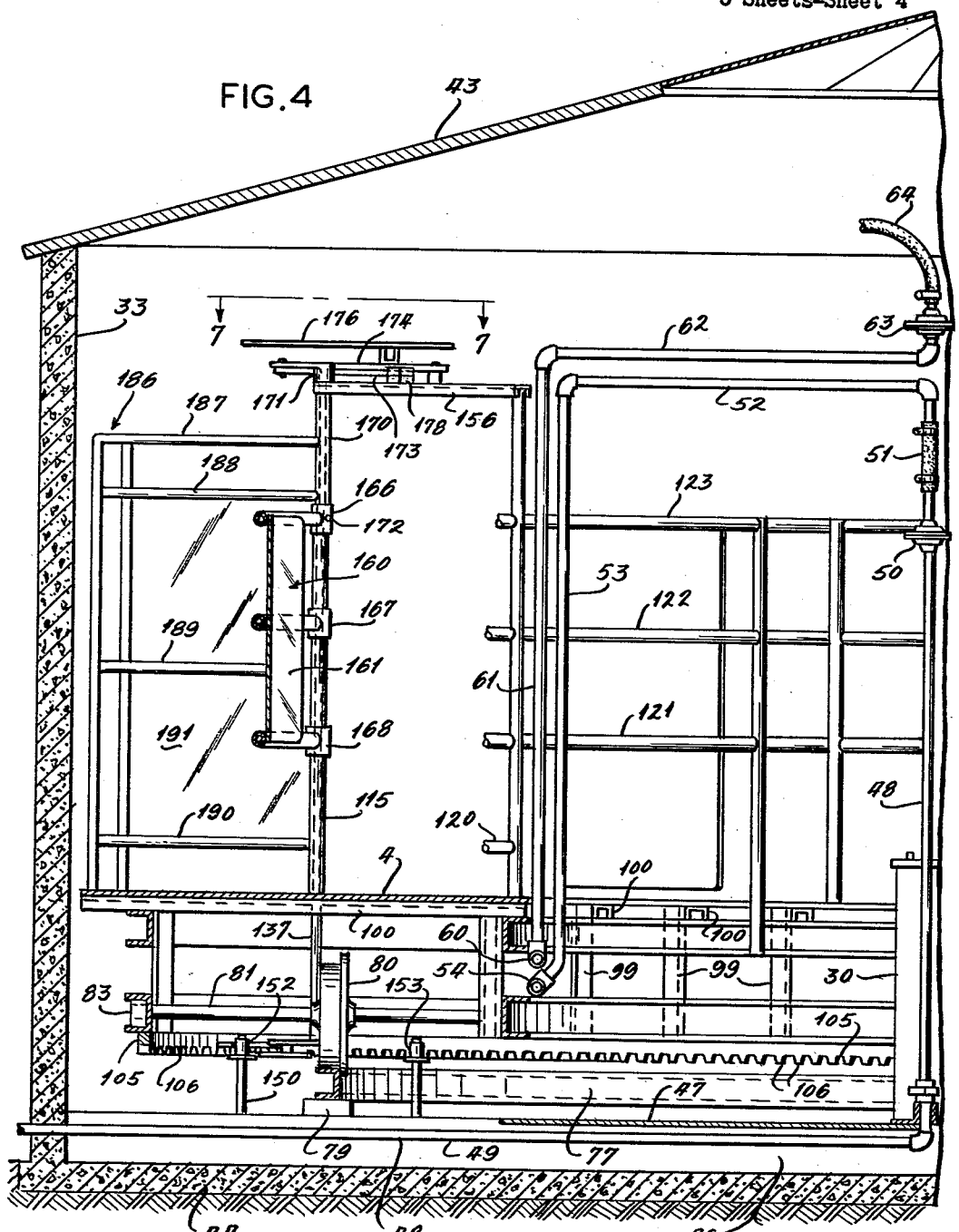

July 2, 1963 D. H. BOTT ETAL 3,095,854
MOVABLE ANIMAL RESTRAINING PLATFORM FOR MILKING STATION
Filed April 19, 1961 5 Sheets-Sheet 5
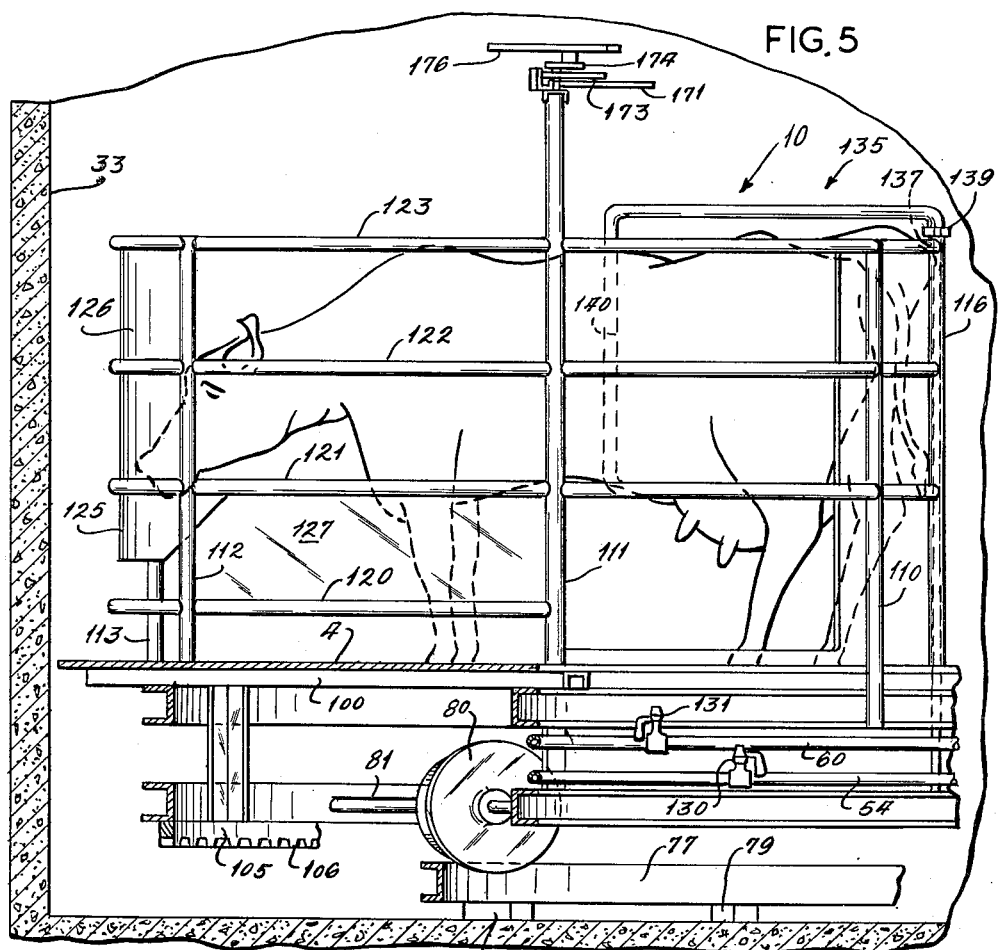
FIG. 5
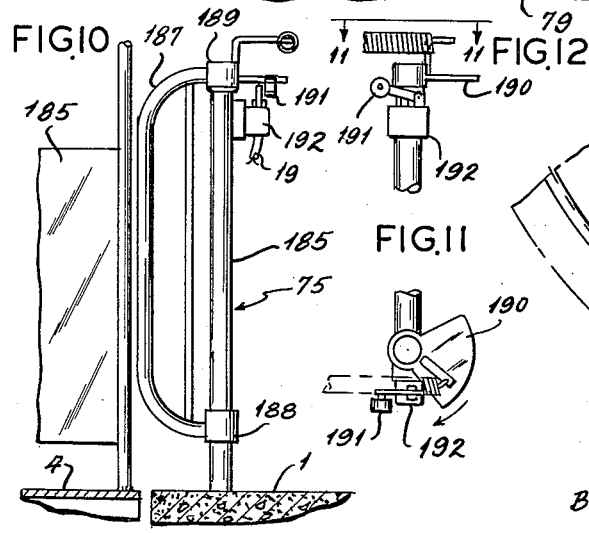
FIG. 10
FIG. 11
FIG. 12
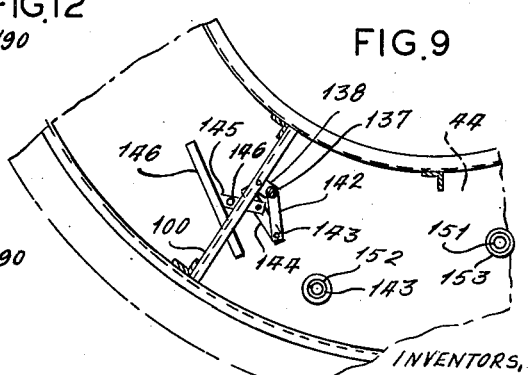
FIG. 9
INVENTORS,
DELMAR H. BOTT
MARVIN O. BOTT
BY Sutherland, Poleter & Taylor
ATTORNEYS.

United States Patent Office 3,095,854
Patented July 2, 1963

3,095,854
MOVABLE ANIMAL RESTRAINING PLATFORM
FOR MILKING STATION
Delmar H. Bott, Godfrey, and Marvin O. Bott,
Brighton, Ill.
Filed Apr. 19, 1961, Ser. No. 104,158
8 Claims. (Cl. 119—14.04)

This invention relates to dairy apparatus and more specifically to an endless movable platform upon which the animals are separately restrained in a proper position as the platform moves around a milking station. The relation of the endless movable platform to the milking station and the location of access and exit runways at the outside of the platform forms a novel dairy system designed for sequential animal movement into and out of the apparatus so that an efficient dairy operation is possible.

According to this invention, the platform upon which the animals move is endless and surrounds a milking station. The access and exit runways are on the opposite side of the platform from the milking station. In the preferred embodiment, the platform is annular and mounts a plurality of stalls for the animals. The stalls are arranged in chordwise relation to the annular platform with the tail end of each stall nearer the inner periphery of the annular platform and the head end of each stall nearer the outer periphery of the platform. The outside of each stall has an automatic access gate and an automatic exit gate. The access and exit runways are located side by side and lead directly to and from the outside of the platform on the gate side of the stalls. A suitable rotatable support and power drive rotates the platform past the access runway and exit runway in that order, but in such a manner that the exit gate opens first to the exit runway and then the access gate opens to the access runway while the exit gate is closing. The arrangement of gates on the stalls and their relative operation at the particular runways contributes to smooth movement of the animals to and from the stalls without mutual interference, and the arrangement of the animals in the stalls, that confine them, provides the desirable position to the milking station.

It is one of the objects of this invention to provide a new and advantageous arrangement for a dairy system.

It is another object of this invention to provide a new and useful dairy apparatus.

It is another object of this invention to provide a dairy system which is more compact because of the novel features of the dairy apparatus forming a part thereof.

It is still another object of this invention to provide a novel construction for operation of parts of a dairy apparatus.

Further objects and advantages will appear in the following description which is in such clear, concise and exact terms as to enable any one skilled in the art to which it pertains to make and use the invention, especially when taken with the accompanying drawings forming a part thereof and in which:

FIG. 4 is a transverse view in section through the dairy apparatus shown in FIG. 1 taken on the line 4—4 looking in the direction of the arrows;

FIG. 5 is a sectional view of another portion of the apparatus shown in FIG. 1 and taken on the line 5—5 thereof looking in the direction of the arrows;

FIG. 7 is an enlarged top plan view of a gate actuating mechanism taken on the line 7—7 of FIG. 4;

FIG. 8 is an enlarged view of a gate operating rotary abutment shown in FIG. 2;

FIG. 9 is a fragmentary sectional view of the supporting structure for the platform with the platform removed similar to FIG. 3 and illustrating an access gate actuating mechanism which is located below the platform;

FIG. 10 is a fragmentary elevational view of a safety mechanism which is located between the runways;

FIG. 11 is a top plan view of the mechanism shown in FIG. 10 taken on the line 11—11 in the direction of the arrows; and FIG. 12 is a fragmentary view of the switch in FIG. 10.

Figure 1:
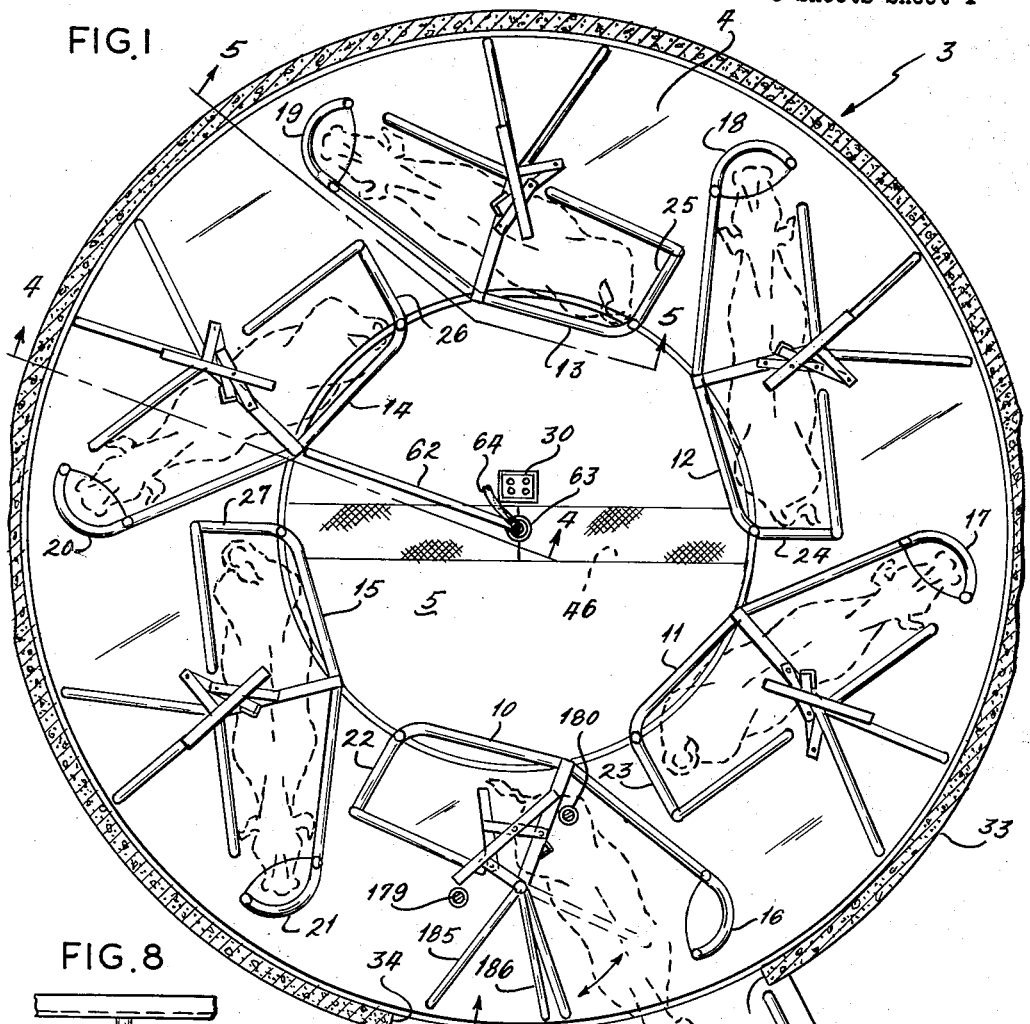
FIG. 1 is an environmental view in plan illustrating the arrangement and operation of the parts of the dairy system.

Turning now to FIG. 1, the construction includes an access runway 1 and an exit runway 2 leading to and from a dairy apparatus, generally indicated as 3, which is an endless annular platform, such as 4, located to surround a work station 5. On the top of the platform 4 are a plurality of stalls 10, 11, 12, 13, 14 and 15 which are equipped to receive and discharge the animals from the runways 1 and 2, respectively, and move the animals in a circuit around the work station where the dairy operation is performed. One of the significant features of this dairy apparatus 3 is that the stalls 10-15, inclusive, are so constructed as to hold the animals chordwise of the annular platform 4 with the head end of each of the stalls 16 through 21, inclusive, located nearer to the outside edge of the platform 4 and the tail ends of the stalls 10 through 15 here indicated as 22 through 27 located nearer to the inside of the annular platform 4.

The work station 5 has a control console 30 upon which may be located the various controls necessary for operating parts of the dairy apparatus, such as platform 4 and the hereinafter described drive mechanism for the same. The entire dairy apparatus 3 is located within a round house 33 which has a single large opening bounded by the ends 34 and 35 of the wall 33 to accommodate the access runway 1 and the exit runway 2. Aligned with the end wall 34 and located on the access runway 1 are a pair of spaced barriers 37 and 38 which will confine the animals to the access runway 1. On the exit runway 2 are a pair of spaced barriers 40 and 41, the latter of which is in alignment with the end wall 35 of the round house 33 so as to confine the movement of the animals to the exit runway 2.

Figure 3:
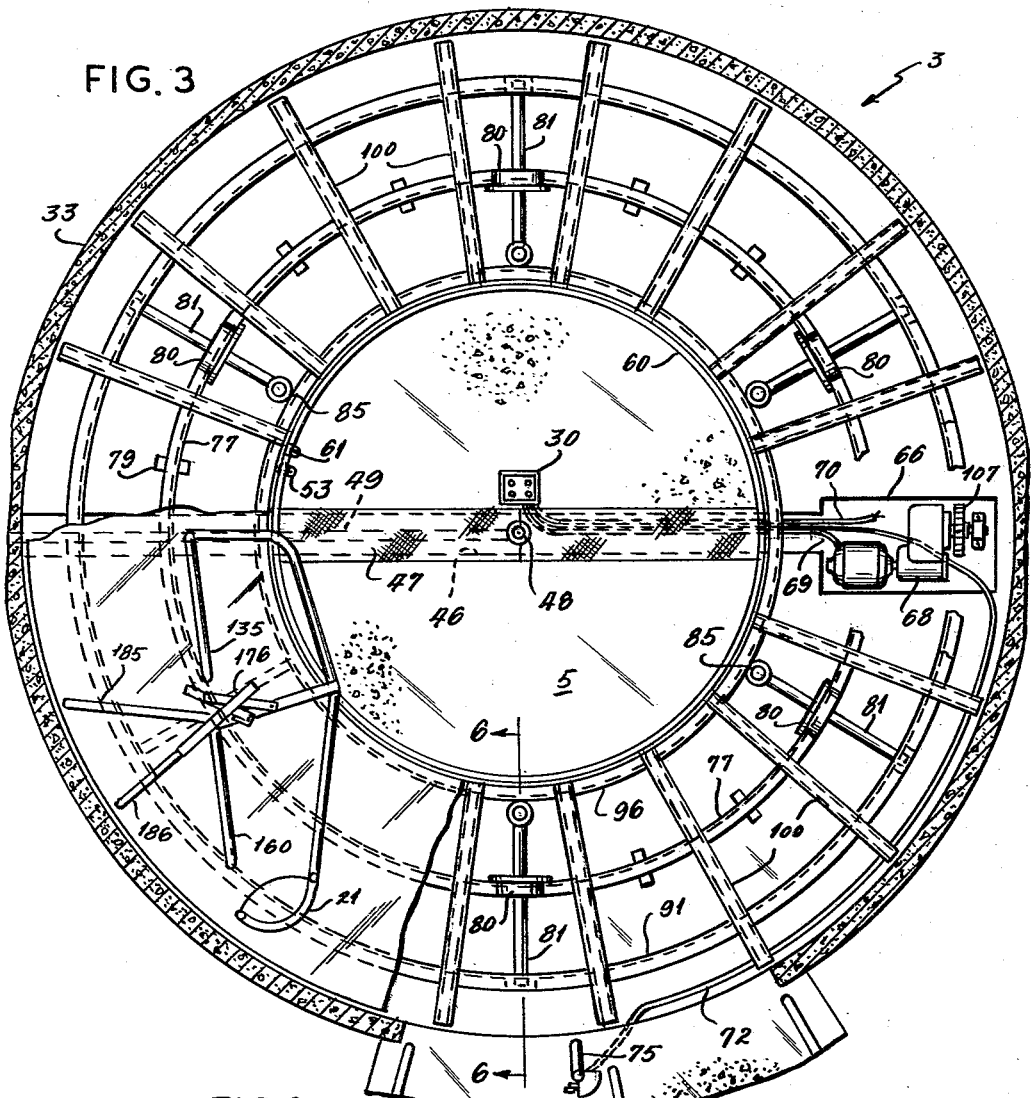
FIG. 3 is a top plan view of the dairy apparatus according to this invention with parts of the platform broken away to illustrate in top plan view the arrangement of the supporting elements and drive for the dairy apparatus.

Turning now to FIG. 4, the round house illustrated as having a wall 33 in FIG. 1, also has a conical roof 43 and rests upon a foundation 44 coextensive with the wall 33. Extending diametrically of the foundation 44 is a trench 46 enclosed at its top side to form a conduit 47, all as shown in FIGS. 3 and 4. Within the conduit 47 are located all the necessary pipe lines, such as 49, which connect with the vacuum pumps and other apparatus necessary to perform the milking operation. The pipe 48 emerges from the conduit 47 and extends upwardly through the center of the work station 5 to a suitable swivel connection 50 and then by way of flexible connection 51 to an overhead radially extending branch 52 and vertical connection 53 to an annular shaped manifold 54 to which the milking attachments may be connected. The manifold 54 is suitably mounted stationary on the rotating platform, and, as the platform rotates, it carries with it connections 51, 52 and 53 which is permitted by the swivel 50. If necessary, other manifolds may be provided on the platform, such as 60, which manifolds may be connected by branches 61 and 62 to the other swivel joints, such as 63, entering the apparatus from above through fixed or flexible line 64. The flexible line 64 may lead to an air or water supply or whatever is necessary for the particular installation. It will be understood that the manifolds 54 and 60 are merely exemplary illustrations of an installation which may contain several similar manifolds for various dairy purposes. The conduit 47 is enlarged at one end, such as shown at 66, to form a pit to accommodate the drive mechanism for the annular platform 4, all as shown in FIG. 3. Within the pit and below the platform is located the motor reduction gearing of drive gear 68. Power is supplied to the motor drive mechanism 68 through cable 69 connected with the console 30 and switches thereon located. A power cable carrying a power supply, indicated as 70, extends from a suitable source of power through the conduit 47 to the console 30. Also located within the conduit 47 is an electric cable 72 which is connected with the switches of the drive mechanism 68 and in the console 30 and extends within the conduit 47 and circumferentially along the wall 33 to a switch of the safety device 75. This safety device 75 is located between the access runway and the exit runway, as shown in FIG. 1.

Figure 6:
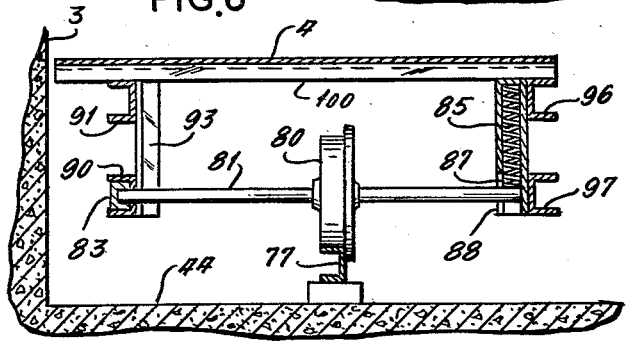
FIG. 6 is a fragmentary sectional view taken on the line 6—6 of FIG. 3.

With particular reference now to FIGS. 3 and 4, the foundation 44 supports a suitable carriage rail 77 secured in position on the foundation 44 by a series of brackets, such as 79. This circular carriage rail 77 passes over the top of the conduit 47, and the conduit thereby forms an access passage beneath the dairy apparatus 3 so that there is no interference between the same and the controls which must be piped or wired into the dairy apparatus. Riding on the carriage rail 77 are a plurality of radially spaced flanged carriage rollers 80. Each of these carriage rollers is in turn rotatable upon fixed shafts 81 which are mounted at one end in a flexible bearing 83 and at the opposite end on the coil spring suspension 85 best shown in FIG. 6. The coil spring suspension 85 is of simple construction and is formed of ordinary steel pipe or the like surrounding and containing a coil spring 87. The pipe is slotted upwardly at 88 on its one side to accommodate movement of the end of the shaft received in the pipe supporting the coil spring 87. This suspension permits the shaft 81 to swing about the flexible bearing 83 at its one end when the spring 87 yields to allow the opposite end of the shaft 81 to slide within the slot 88. Thus, irregularities within the carriage rail 77 are absorbed by the cushioning action of the spring 87, and, at the same time, the axle 81 is confined in position to hold the carriage wheel in engagement with the carriage rail.

The bearing 83 and 85 for holding the carriage wheels are in turn supported within a frame work which forms the sub-structure for the platform 4. This sub-structure includes a pair of superposed externally facing circular channel members 90 and 91 coextensive with the platform 4 and spaced inwardly and below the outer periphery thereof. These channel sections are held spaced by suitable strut members 93 located at intervals around the circumference of the platform sub-structure and welded at opposite ends to the inside faces of the externally facing channel sections 90 and 91. Adjacent the inner periphery of the platform 4 are corresponding internally facing circular channel sections 96 and 97 located one above the other. These extend around the entire periphery of the platform 4 beneath the inner edge thereof and are held in spaced relation by struts 99 welded at their opposite ends to the inner face of the circular channel members 96 and 97. Preferably the struts 93 and 99 are radially aligned in pairs and project slightly beyond the upper surface of the channel members 91 and 96 an amount corresponding to the thickness of a series of channel members 100 which have their legs resting upon the upper surface of the channel members 91 ond 96 and are suitably welded to the upper surface thereof with their side faces in engagement with the protruding ends of the struts 93 and 99. Thus, the sub-structure for supporting the platform 4 is an annular frame work box extending thereunder, and the upper platform 4 is secured to the upper faces of the radially extending members 100 enclosing the top side of the sub-structure. Preferably the platform 4 is steel plate welded in position.

The bottom surface of the externally facing channel member 90 has welded thereto a circular rack 105 whtich has downwardly projecting teeth 106 which in turn mesh with spur gear 107, shown in FIG. 3, which is driven by the motor drive mechanism 68.

From what has been described so far, it will be apparent that the platform 4 is a steel plate resting on a suitable box-like sub-structure which in turn supports a plurality of swing axles 81 rotatably mounting the carriage rollers 80. A circular carriage rail 77 is the track and guide means for the flanged carriage rollers 80 upon which the sub-structure and platform rotate about the milking station 5 driven by a motor drive mechanism 68 through engagement of a spur gear 107 on this motor drive mechanism with the teeth 106 of circular rack 105 mounted on the sub-structure for the platform. The motor drive mechanism 68 is in turn supplied with power under control of the operator at the milking station. On the console may be other controls including a speed control for the motor drive for varying the rotational speed of the platform 4. For example, a normal speed of the platform may be about one revolution in seven and one-half minutes, but, by control means on the console, this speed may be slowed down or increased to a revolution in every six minutes. Thus, the rotation of the platform may be adjusted so that its timed rotation coincides with the time required to milk a single cow.

Turning now to the structure supported on the platform 4, reference is made particularly to FIG. 5. Each stall, such as 10, is constructed in exactly the same manner of the same components arranged in the same way, and so a description of one stall will serve for all. For example then, the stall 10, shown in FIG. 5, has an upright in the form of iron pipe or tube 110 secured in a vertical position by attachment to the platform 4 and its sub-structure at the inner periphery of the platform 4. Also located at the inner periphery of the platform 4 and attached to the sub-structure is an upright 111 which may also be constructed of iron pipe or tube. Toward the outside periphery of the platform 4 is an upright 112 secured to the platform by welding. These are the uprights of the stall located at the inner side of the annulus of the platform 4. Adjacent the outer periphery of the annulus formed by platform 4 is still another fixed tubular or iron pipe upright 113 also suitably secured to the platform by welding or the like. Uprights 110, 111, 112 and 113 are fixed uprights held in fixed position upon the platform 4. Horizontal bars 120, 121, and 122 and 123 are welded in spaced vertical relation to the uprights 110, 111, 112 and 113. These form the enclosure for the inner side of each of the stalls. At the head end of each stall adjacent the uprights 112 and 113 is a feed trough 125 which is part of a curved panel 126 enclosing the front of the stall. If desired, the bottom part of the stall between the uprights 111 and 112 may be enclosed by a panel 127 extending upwardly from the platform to the horizontal bar 121 or 122. The horizontal bar 120, however, terminates at the upright 111 leaving open the space bounded by the platform 4, upright 110 and 111 and horizontal 121 so as to provide access to the animal. At this point, the manifolds 54 and 60 are provided with stop cocks 130 and 131 to which the milking apparatus may be attached.

The outside of the stall 10 is formed by two swinging gates, one called an access gate and the other an exit gate. The access gate 135 is mounted to swing on the fixed upright 116 of the stall. A shaft 137, shown in FIG. 5, extends downwardly through the tubular upright 116, the platform 4 and is rotatably mounted in a fixed bearing 138, see FIG. 9, in turn secured to the side of one of the members 100 of the sub-structure for the platform 4. This shaft 137 may be a tubular shaft and it is held against endwise movement at the upper end of the upright 116 by a collar 139 secured thereto. The gate 135 in turn is a continuation of the shaft 137, which portion forming the gate 135 is bent into a loop 140, the end of which terminates adjacent the upright 116. The lower end of the shaft 137 carries an arm 142 rigidly secured thereto which has its free outer end pivoted at 143 to a toggle linkage 144. One arm of the toggle linkage 145 is pivoted at 146 to a fixed bearing mounted on one of the members 100 of the sub-structure for the platform. The free end of the toggle member 145 is in turn rigidly secured to an actuated bar 146 which is a rigid bar. Preferably the member 100 mounts a pin adjacent one end of one arm of the toggle 144 to prevent movement of the toggle in one direction.

Mounted under the sub-structure of the platform 4 on the foundation 44 are two uprights 150 and 151 carrying rotatable flange rollers 152 and 153, respectively. One of these rollers 152 is positioned as shown in FIG. 4 to engage the end of bar 149 and swing it about its pivot 146 thereby pivoting the toggle lever 144 beyond dead center and rotating the shaft 137 in a direction to open the gate 135. The gate remains open until the opposite end of the bar 149 engages the roller 153 which pivots the toggle in the opposite direction beyond dead center rotating the gate 135 to closed position and locking it in this position due to the fact that the toggle 144 passes beyond dead center.

Returning now to consideration of FIG. 4, a tubular upright 115 is securely welded to the platform 4 in spaced relation to the upright 111 and the two are interconnected at their top by a channel iron bridge 156. Hingedly mounted upon the tubular upright 115 is exit gate 160 which is formed of a panel 161 and a plurality of horizontal supports 162, 163, and 164 to which the panel 161 is connected. The horizontal supports 162 through 164 are tubular supports to which the panel 161 is preferably welded and these in turn have their inner ends welded to sleeves 166, 167 and 168 rotatable on the upright 115. The bridge member 156 is apertured at the top of the upright support 115 to receive a vertical shaft 170 which is connected at its top end with a crank 171 and at its bottom end with the hinge 166 by means of a pin 172. The pin 172 is securely attached at opposite ends to the sleeve 166 and into the shaft 170, and the upright 115 is suitably slotted to allow angular rotation of the pin 172 in the slot as the gate 160 swings from a closed to full open position.

The actuator for operating the gate 160 by turning the shaft 170 is constructed in the same manner as the actuator for the gate 135. Turning now to FIG. 7, it will be seen that the free end of the crank arm 171 on the top end of the shaft 170 is pivotally secured to a toggle mechanism comprising the levers 173 and 174. Securely welded to the upper side of the lever 174 is an actuating bar 176. A stop 178 is provided for engaging the side of the link 173 when the gate 160 is in closed position. In this position, the toggle 173, 174 is in an over center position locking the gate 160 in closed position. Actuation of the actuating bar 176 is performed by the rotation of the platform 4 which engages opposite ends of the actuating bar 176 with rotary abutments 179 and 180. These are flanged rollers on upright supports depending from a fixed stationary position by either being attached or suspended from the roof 43 of the round house or from stationary brackets overhanging the stalls. In any event, however supported, flange roller 179 will engage the inner end of the actuating bar 176 after an animal has passed out of the stall down the exit runway and close the gate before, or coincidentally with, the entrance of an animal into the stall. Gate 160 then is in locked closed position and will remain in this position until the stall again approaches the exit runway during its revolution. As the stall approaches the exit runway 2, the outer end of the actuating bar 170 engages the roller abutment 180 which in turn swings the actuating bar unlocking the toggle from its over center position and rotating the shaft 170 to open the gate 160 so that the animal escapes from the stall and exits down the exit runway. Both gate 135 and 160 will remain open until closed by its actuating and locking mechanisms.

Between the gates 135 and 160 and also mounted on the upright 115 are two barriers 185 and 186, shown in FIG. 1. The barrier 186 in FIG. 5 is formed of an L-shaped tube or pipe member 187 bent intermediate its length and secured at one end of the platform 4 and at its other end to the upright 115. Horizontal tubular members 188, 189, and 190 are secured at their opposite ends to the member 187 and the upright 115 forming a frame work.

The barrier 185 is constructed in exactly the same manner as the barrier 186 and the horizontal tubular elements therein mount a panel 191 which blocks the animal's view when in the position of the platform shown in FIG. 1. Such a blind is usually sufficient to prevent the animal from sticking its head in between the barriers 185 and 186, because it will not advance unless it can see a passage through which to move. When there is such a passage, the animal moves instinctly forward. However, in case of unusual circumstances, it is entirely possible to bar entrance of the animal's head between the barriers 185 and 186 by connecting the outer ends of the barriers by suitable bars. Whether this is done or not, it is safer to have some means in case the animal panics and gets trapped between fixed and rotating parts of the mechanism. This safety means is the small hinged gate 75 shown in FIG. 10 in detail and located as illustrated in FIG. 1. An upright 185 is vertically mounted in alignment with the barrier 38 on the access runway 1. On the upright 185 is a small hinged gate 187 rotatably supported on the upright by the sleeves 188 and 189. There is a small arm projecting opposite from the direction of the gate 187 and the end of this arm carries a spring which may be attached to the barrier 187 so as to maintain the gate 187 aligned with the barrier 188, but permit yieldable swinging of the gate 187 in either direction. Also secured to the support 189 for the gate 187 and movable with the gate is a flat plate 190 of arcuate shape, such as shown in FIG. 11 and FIG. 12, which moves in an arcuate path when the gate 187 is swung upon its support 185 toward and away from a switch actuator 191 on a switch 192. Switch 192 in turn is connected by a cable 72, as shown in FIG. 3, with the console 30 and in series between the power source and the motor drive mechanism 68. When the plate 190 is swung by movement of the gate in a clockwise direction, it contacts with the switch actuator 191 opening the switch 192 and stopping the drive for the platform 4. Accordingly, if due to panic, the animal catches some part of its body between the barriers 185 and 186 and the movement of the platform is rapidly enough to trap the animal against the safety 75, gate 187 which forms the part of the safety mechanism will swing in a clockwise direction opening the switch 192 and stopping the drive.

*Operation*

From the above description of the detailed structure, it will be observed that the operator occupies the milking station 5 during the operation of the device, and that generally the system is such that the entrance and exit of the animals to the dairy apparatus does not interfere with the operator because the animals gain access to and exit from the dairy apparatus from the outside while the operator occupies the space within the dairy apparatus. With the operator in this position, he has access to the console 30, which not only contains the necessary switches for driving the dairy apparatus, but also any others that may be conveniently located in this position. Thus, from this position at the console, he can operate the necessary switches to start the drive mechanism 68 which in turn rotates the pinion 107 in engagement with the circular rack 105 attached to the sub-structure of the platform 4. This rotates the platform 4 about a circular path on the carriage rollers 80 engaging the track 27. From the console 30, he can also control the speed of rotation of the platform 4.

Assuming that the platform 4 is now rotating, the animals approach the platform through the access runway 1, and, if the end of the access runway 1 is barred by either the head end of a stall or its blind formed by the barriers 185 and 186, the animal waits until the barriers clear the end of the access runway, as shown in FIG. 1. As the barrier 185 begins to open the end of the access runway 1, roller abutment 143 engages the outer end of actuating bar 149 unlocking the access gate 135 and gradually swinging the access gate open. The animal seeing that the passage is now open will advance through the gate 135 into one of the stalls, such as 10. There will be plenty of time for the animal to make its entrance because of the slow speed of rotation of the platform 4, however, if the animal is not completely within the stall by the time the platform rotates to engage the opposite end of the actuating bar 149 with the abutment roller 153, the animal is not harmed for the gate 135 simply closes slowly forcing the animal into position within the stall. After the gate 135 has forced the animal in position, the milking apparatus is applied by the operator and further rotation moves the toggle 144 beyond dead center locking the gate 135 closed. If desired, the apparatus may be so arranged that as the animal enters the gate 135, feed is dropped into the trough 125. If this is done, the animal starts to feed during the milking operation as it travels around on the platform 4, and the operator applies the milking equipment to the next animal entering the next succeeding stall. Because this takes place within a small range of arcuate movement of the platform, the operator has very little moving back and forth to do.

Figure 2:
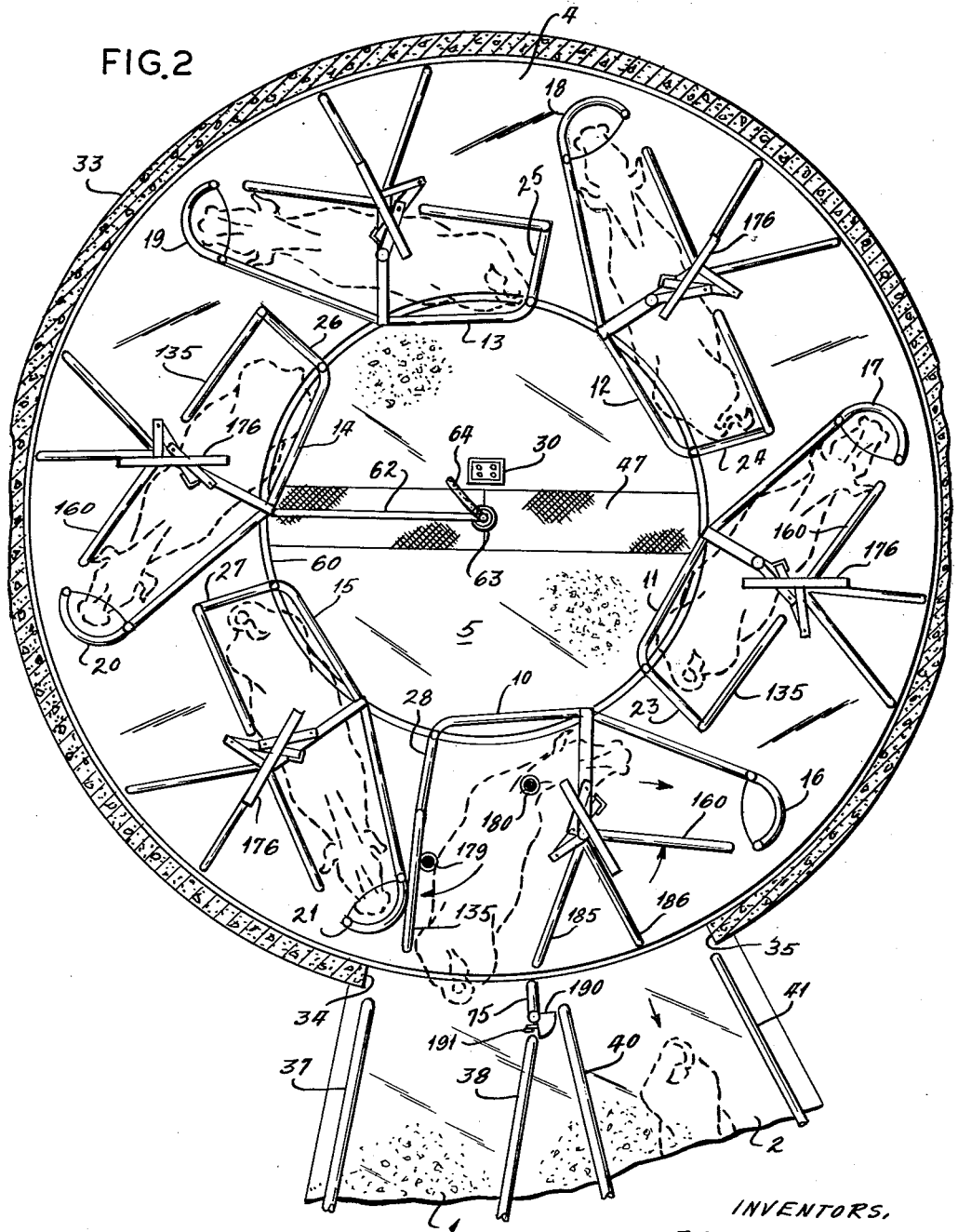
FIG. 2 is a view similar to FIG. 1 also illustrating the operation of the invention in a phase subsequent to that shown in FIG. 1.

Approximately six or seven minutes after the first animal enters the stall, the milking operation will be complete. The operator then removes the milking apparatus from the animal as the stall approaches the milking station and gets ready to apply it to the next animal to enter that stall. As the stall approaches the runway 2, actuating bar 176 will engage the rotary abutment 180 turning the bar clockwise, as viewed in FIG. 7, thereby moving the toggle mechanism beyond dead center to start the opening movement of the gate 160 which is so timed that as the platform rotates the outer end of the gate 160 will remain approximately aligned with the barrier 40 on one side of the exit runway 2. When the animal sees a passage open, it advances and so leaves the stall down the exit runway 2. Further movement of the stall removes the barriers 185 and 186 from the end of the access runway, as shown in FIG. 2, and opens the gate 135 so that another animal enters the stall that has just been vacated. In the meantime, the actuating bar 176 has engaged with the rotary abutment 179 which in turn closes the exit gate 160 and locks it. Each gate actuating mechanism is self-locking so that it cannot swing free at any time and thereby jam up the mechanism.

Changes in and modifications of the construction described may be made without departing from the spirit of our invention or sacrificing its advantages.

Having thus described the invention, what is claimed and desired to be secured by Letters Patent is:

1. Milking apparatus for dairy cows and the like comprising an endless movable platform means, means associated with said platform means for moving the same in an orbital path, said platform having an inner and an outer periphery, a plurality of cow confining means arranged along said platform, each confining means having a front end and a rear end, said rear end of each confining means being located adjacent the inner periphery of said platform, connections for milking equipment located adjacent the inner periphery of said platform, and adit and exit means located adjacent the outer periphery of said platform.

2. The milking apparatus of claim 1 wherein a control console for the endless platform means is located within the inner periphery of said platform means.

3. The milking apparatus of claim 1 wherein the adit and exit means includes a stationary adit walkway and a stationary exit walkway, said walkways being located immediately adjacent each other at the outer periphery of said platform and so located with respect to the direction of movement of said platform means that a given point on said platform means passes the adit walkway before it reaches the exit walkway.

4. The milking apparatus of claim 1 wherein the adit and exit means includes an adit gate at the rear end and an exit gate at the front end of each of the cow confining means.

5. The milking apparatus of claim 1 wherein the adit and exit means includes a stationary adit walkway and a stationary exit walkway immediately adjacent each other at the outer periphery of said platform means and so located with reference to the direction of movement thereof that the exit gate passes the adit walkway before reaching the exit walkway.

6. The milking apparatus of claim 1 wherein the exit means includes exit gates for each cow confining means, said exit gates being hinged at their trailing ends.

7. The milking apparatus of claim 1 wherein said cow confining means extend chordally of said platform with their rear ends substantially tangent with the inner periphery of said platform and their front ends substantially radially outward of and in leading relationship to said rear ends.

8. The milking apparatus of claim 1 wherein said platform means is provided with roller means for guiding it during movement through said orbital path, and resilient cushioning means between said roller means and said platform.

References Cited in the file of this patent

UNITED STATES PATENTS

| | | |
|---|---|---|
| 1,968,564 | Luks | July 31, 1934 |
| 2,039,562 | Shodron | May 5, 1936 |
| 2,305,259 | Jeffers | Dec. 15, 1942 |
| 2,904,001 | Ferris | Sept. 15, 1959 |
| 2,910,965 | Cann | Nov. 3, 1959 |
| 2,969,039 | Golay | Jan. 24, 1961 |